US008857133B2

(12) United States Patent
Powers, III

(10) Patent No.: US 8,857,133 B2
(45) Date of Patent: Oct. 14, 2014

(54) PURLIN CONSTRUCTION FOR ROOF STRUCTURES

(76) Inventor: John Powers, III, Phoenix, AZ (US)

( * ) Notice: Subject to any disclaimer, the term of this patent is extended or adjusted under 35 U.S.C. 154(b) by 0 days.

(21) Appl. No.: 13/610,228

(22) Filed: Sep. 11, 2012

(65) Prior Publication Data

US 2013/0133284 A1 May 30, 2013

Related U.S. Application Data

(60) Provisional application No. 61/563,997, filed on Nov. 28, 2011, provisional application No. 61/608,122, filed on Mar. 8, 2012.

(51) Int. Cl.
*E04C 3/07* (2006.01)
*E04C 2/32* (2006.01)
*E04C 3/04* (2006.01)

(52) U.S. Cl.
CPC ........... *E04C 3/07* (2013.01); *E04C 2003/0443* (2013.01)
USPC .......................... 52/846; 52/650.1; 52/745.19

(58) Field of Classification Search
USPC .................. 52/633, 637, 648.1, 649.6, 650.1, 52/650.3, 653.1, 653.2, 481.1, 846, 831; D25/119, 121, 123, 126, 132
See application file for complete search history.

(56) References Cited

U.S. PATENT DOCUMENTS

| D237,270 | S | * | 10/1975 | Edwards ...................... D25/123 |
| 3,940,899 | A | * | 3/1976 | Balinski ...................... 52/481.1 |
| 4,353,192 | A | * | 10/1982 | Pearson et al. .................. 52/281 |
| D553,261 | S | * | 10/2007 | Antonic ...................... D25/119 |
| D554,273 | S | * | 10/2007 | Antonic ...................... D25/121 |
| D554,773 | S | * | 11/2007 | Antonic ...................... D25/119 |
| D624,210 | S | * | 9/2010 | Antonic ...................... D25/121 |
| D625,843 | S | * | 10/2010 | Antonic ...................... D25/121 |
| D625,844 | S | * | 10/2010 | Antonic ...................... D25/121 |
| 2005/0252149 | A1 | * | 11/2005 | Ritchey et al. ............... 52/648.1 |
| 2011/0252724 | A1 | * | 10/2011 | Heisler ........................ 52/173.3 |

* cited by examiner

*Primary Examiner* — William Gilbert
*Assistant Examiner* — Kyle Walraed-Sullivan
(74) *Attorney, Agent, or Firm* — Parsons & Goltry; Robert A. Parsons; Michael W. Goltry

(57) ABSTRACT

An elongated purlin for use in roof structures includes an elongated mounting wall designed to be mounted to and supported on roof beams, an upright wall affixed to the mounting wall and extending longitudinally approximately the length of the mounting wall, and first and second horizontally outwardly opening channels affixed to the upright wall and extending approximately the length of the upright wall. The first and second channels open outwardly in opposite directions and each of the first and second channels is designed to receive an edge of a solar panel or roof section engaged therein.

11 Claims, 5 Drawing Sheets

PURLIN CONSTRUCTION FOR ROOF STRUCTURES

CROSS-REFERENCE TO RELATED APPLICATIONS

This application claims the benefit of U.S. Provisional Patent Application No. 61/563,997, filed 28 Nov. 2011 and to U.S. Provisional Patent Application No. 61/608,122, filed 8 Mar. 2012.

FIELD OF THE INVENTION

This invention generally relates to purlin type supports for roof structures. The invention further relates to solar panels or roof sections mounted on or forming the roof.

BACKGROUND OF THE INVENTION

At the present time, metal roof structures and/or solar panel mounts include purlins in a generally C-shape or, in some instances, a box-shape for extra strength. The solar panels are then mounted on the purlins by means of bolts, screws, or other fastening devices. The purlins have an upper flat surface to which the solar panels are attached. The problem that arises is that the process of attaching the solar panels to the upper flat surface of the purlins is exceptionally difficult and time consuming.

For example, the solar panels or other roof sections must be placed on the upper flat surface of the purlins which can be a difficult task for larger roof areas, and then attached to the purlins by some attachment devices. The attachment devices can, primarily, be only inserted through the purlins and into the roof sections from the bottom or beneath the roof. This can be a daunting task since the roof sections are loose and held in place only by their weight. Thus, during the step of fixing the roof sections to the purlins the roof sections can become misaligned or incompletely attached. That is some bolts, screws, or other attachment devices can be inadvertently inserted through the solar panel proper or roof section proper rather than through supporting structures surrounding the solar panels or roof sections. Also, even if the assembly is error free, the task is very work intensive with the time and effort increasing as the errors are eliminated or attempted to be eliminated.

It would be highly advantageous, therefore, to remedy the foregoing and other deficiencies inherent in the prior art.

Accordingly, it is an object of the present invention to provide a new and improved purlin for roof structures.

It is another object of the present invention to provide a new and improved purlin for roof structures to which solar panels or roof sections can be easily and quickly attached.

It is another object of the present invention to provide a new and improved purlin for roof structures that can be easily bolted together at the site and does not require any on-site welding.

It is another object of the present invention to provide a new and improved purlin for roof structures that are relatively simple and inexpensive to manufacture and install.

SUMMARY OF THE INVENTION

Briefly, to achieve the desired objects of the instant invention in accordance with a preferred embodiment thereof, an elongated purlin for use in roof structures includes an elongated mounting wall designed to be mounted to and supported on roof beams, an upright wall affixed to the mounting wall and extending longitudinally approximately the length of the mounting wall, and first and second horizontally outwardly opening channels affixed to the upright wall and extending approximately the length of the upright wall. The first and second channels open outwardly in opposite directions and each of the first and second channels is designed to receive an edge of a solar panel or roof section engaged therein.

The desired objects of the instant invention are further realized in accordance with a specific embodiment thereof. In the specific embodiment an elongated purlin for use in roof structures includes an elongated mounting wall designed to be mounted to and supported on roof beams, an upright wall formed integrally with the mounting wall and extending longitudinally the length of the mounting wall, first and second horizontally outwardly opening channels affixed to the upright wall and extending the length of the upright wall, the first and second channels opening outwardly in opposite directions and each of the first and second channels being designed to receive an edge of a solar panel or roof section engaged therein. The elongated mounting wall, the upright wall, and the first and second horizontally outwardly opening channels are formed of sheet metal and the first and second channels are either integrally formed with the upright wall or spot welded to the upright wall.

The desired objects of the instant invention are further realized in accordance with a preferred method of fabricating an elongated purlin for use in roof structures. The method includes the steps of forming an elongated mounting wall designed to be mounted to and supported on roof beams, forming an upright wall integrally with the mounting wall and extending longitudinally the length of the mounting wall, and forming first and second horizontally outwardly opening channels designed to receive an edge of a solar panel or roof section engaged therein, and affixing the first and second channels to the upright wall in an outwardly opening orientation, the openings being directed in opposite directions.

The desired objects of the instant invention are further realized in accordance with a specific method of fabricating an elongated purlin for use in roof structures including the steps of providing an elongated strip of sheet metal, forming the elongated strip into an elongated mounting wall designed to be mounted to and supported on roof beams, forming the elongated strip into an upright wall integrally with the mounting wall and extending longitudinally the length of the mounting wall, and forming the elongated strip into first and second horizontally outwardly opening channels designed to receive an edge of a solar panel or roof section engaged therein. The first and second channels are oriented in an outwardly opening orientation and the openings are directed in opposite directions.

BRIEF DESCRIPTION OF THE DRAWINGS

The foregoing and further and more specific objects and advantages of the instant invention will become readily apparent to those skilled in the art from the following detailed description of a preferred embodiment thereof taken in conjunction with the drawings, in which.

DETAILED DESCRIPTION OF A PREFERRED EMBODIMENT

Figure 1:
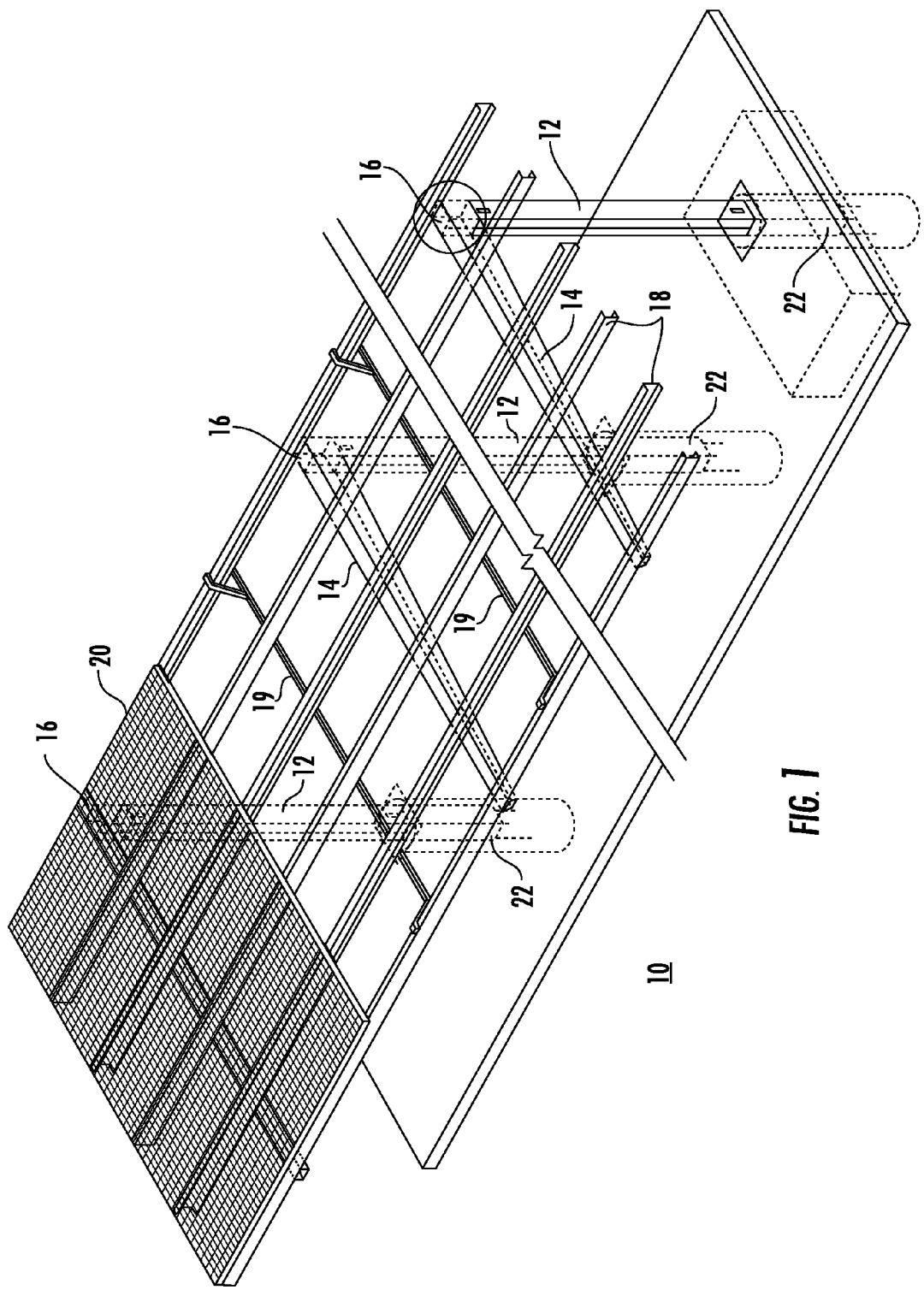
FIG. 1 is an isometric top view of a flat, cantilevered multi-column roof structure of a type anticipated for the present invention.

Turning now to FIG. 1, a flat, cantilevered multi-column structure 10 is illustrated. Structure 10 includes a plurality of vertical columns or posts 12 each with a cantilever beam 14 attached to an upper end 16. A plurality of purlins 18 are affixed to upper surfaces of beams 14 and positioned to extend longitudinally in parallel spaced apart relationship to substantially define the roof area. Additional purlin braces 19 can be incorporated between cantilever beams 14 for additional support if desired or deemed necessary. Some roofing material, such as solar panels or flat roof sections 20 are attached to the upper surface of purlins 18 to form a complete roof. One example of roofing material or flat sections that can be used for sections 20 is provided in copending United States patent application entitled "Solar Support Structure", bearing Ser. No. 13/036,858, filed on 28 Feb. 2011, and incorporated herein by reference.

For purposes of this disclosure it should be understood that structure 10 is chiefly assembled at the site and it is highly desirable that each step of the assembly procedure be as simple as possible. Basically, each of the components mentioned above (i.e. column 12, beams 14, purlins 18, and roof sections 20) are provided as individual items from a factory/shop and assembled on site into structure 10. By providing the items separately each item can be relatively easily handled by workmen conveying the items to the site and by workmen doing the assembling at the site. Briefly, the assembly procedure includes fixing a lower end 22 of each column 12 in the ground or in a base that serves as the ground. One end of a cantilever beam 14 is affixed to the upper end 16 of each column 12 by structure that is described in more detail in a copending United States patent application entitled "Flat Roof Support Structure", bearing Ser. No. 61/481,747 filed on 3 May 2011, and incorporated herein by reference.

With cantilever beams 14 fixedly attached, purlins 18 are attached to the upper surface of cantilever beams 14 in a direction perpendicular to cantilever beam 14. Again the attachment of purlins 18 to cantilever beams 14 is illustrated in detail in the above described copending patent application. At this point additional purlin braces 19 can be affixed to purlins 18 between cantilever beams 14 if desired or deemed necessary. Roof sections 20 are then attached to the upper surfaces of purlins 18 in any well known manner (see for example the structure disclosed in the above identified copending patent application) and using any well known attachment devices such as screws, bolts, etc. It will be understood that structure 10 is used simply as an example of a flat roof structure and many alterations and changes may be incorporated for specific applications.

Purlins 18 illustrated in the above described copending patent application and FIG. 1 are illustrated as the prior art purlins with a standard C-shaped cross section. As explained above, attaching solar panels or flat roof sections to the upper surface of purlins 18 can be extremely difficult and time consuming. To overcome this problem the new and novel purlin illustrated in FIGS. 2 and 3 and designated 118 is designed to replace purlins 18 in FIG. 1.

Figure 2:
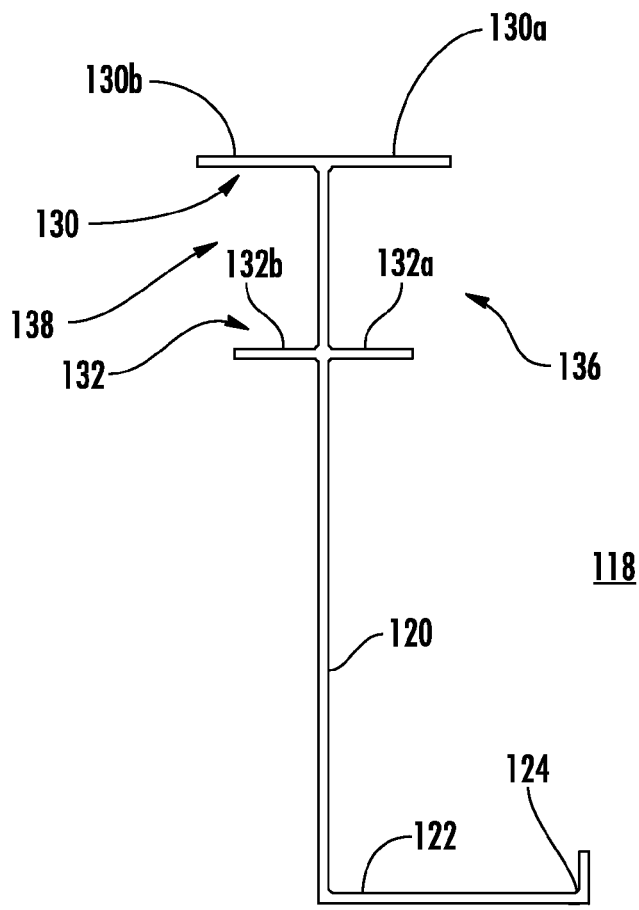
FIG. 2 is an end view of an improved purlin used in the structure of FIG. 1 in accordance with the present invention.
Figure 3:
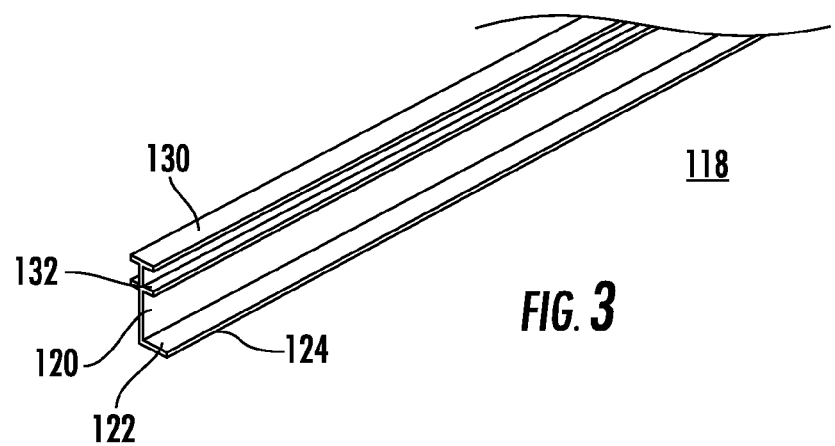
FIG. 3 is a partial longitudinal perspective view of the improved purlin illustrated in FIG. 2.

Referring specifically to FIGS. 2 and 3, purlin 118 includes a major side or upright wall 120 with a lower or mounting wall 122 extending horizontally at a right angle to upright wall 120. An upright flange 124 is optionally formed at the outer edge of mounting wall 122 to add stiffness or additional lateral support to purlin 118. Upright wall 120, mounting wall 122, and flange 124 extend longitudinally the entire length of purlin 118. The lower surface of mounting wall 122 is designed to be mounted to and supported on roof beams, such as cantilever beams 14 in FIG. 1. The attaching of purlins 118 to the roof beams is described in detail in one or both of the above cited copending patent applications and will not be elaborated upon further herein.

A first cross piece 130 is formed integrally with and at the upper end of upright wall 120. Cross piece 130 extends horizontally outwardly in opposite directions from upright wall 120 to form a T-shape with upright wall 120. The portion of cross piece 130 extending outwardly to the right in FIG. 2 is designated 130a and the portion of cross piece 130 extending outwardly to the left in FIG. 2 is designated 130b. In a similar fashion a second cross piece 132 is formed integrally with upright wall 120 and spaced downwardly from cross piece 130. Cross piece 132 extends horizontally outwardly in opposite directions from upright wall 120 to form a T-shape with upright wall 120. The portion of cross piece 132 extending outwardly to the right in FIG. 2 is designated 132a and the portion of cross piece 132 extending outwardly to the left in FIG. 2 is designated 132b.

As can be seen best in FIG. 2, portions 130a and 132a cooperate to form a longitudinally extending channel 136 therebetween. Similarly, portions 130b and 132b cooperate to form a second longitudinally extending channel 138 therebetween positioned in an opposed direction with channel 136. It will be understood that channel 136, along with a facing channel in the next adjacent purlin form a complete track for receiving and holding opposed edges of a solar panel or flat roof section. Similarly, channel 138, along with a facing channel in the next adjacent purlin, form a complete track for receiving and holding opposed edges of an adjacent solar panel or flat roof section. Thus, solar panels or flat roof sections are quickly and easily attached by simply sliding them longitudinally into cooperating channels in adjacent purlins. The solar panels or flat roof sections can be fixed in place by optionally inserting attachment devices such as screws, bolts, etc. upwardly through the proper portion 132a or 132b supporting the solar panel or flat roof section.

It will be understood that portions 130a and 130b and portions 132a and 132b can be the same horizontal length or one or the other can be extended slightly horizontally to add additional support where desired. Also, in the form of a specialty item, purlins with portions 130b and 132b can be eliminated to form edge purlins for the edge of the roof.

Some measurements for purlin 118 manufactured in accordance with the present invention, as illustrated in FIG. 2, include the following. The total vertical height of upright wall 120 is 7.0"; the horizontal width of mounting wall 122 is 2.50"; the vertical height of flange 124 is 0.50"; portions 130a and 130b extend horizontally a total distance of 2.250" from edge to edge; and each portion 132a and 132b extends horizontally outwardly 0.750". Also, the vertical spacing between the lower surface of cross piece 130 and the upper surface of cross piece 132 is 1.750". Preferably, the thickness of the material forming purlin 118 is 0.070". It will be understood that these measurements are simply included for example and any measurements may change for specific applications. Further, since the purlin 118 is preferably formed as a single integral unit for the entire length, at least one method of manufacture includes extruding in a well known operation.

Figure 4:
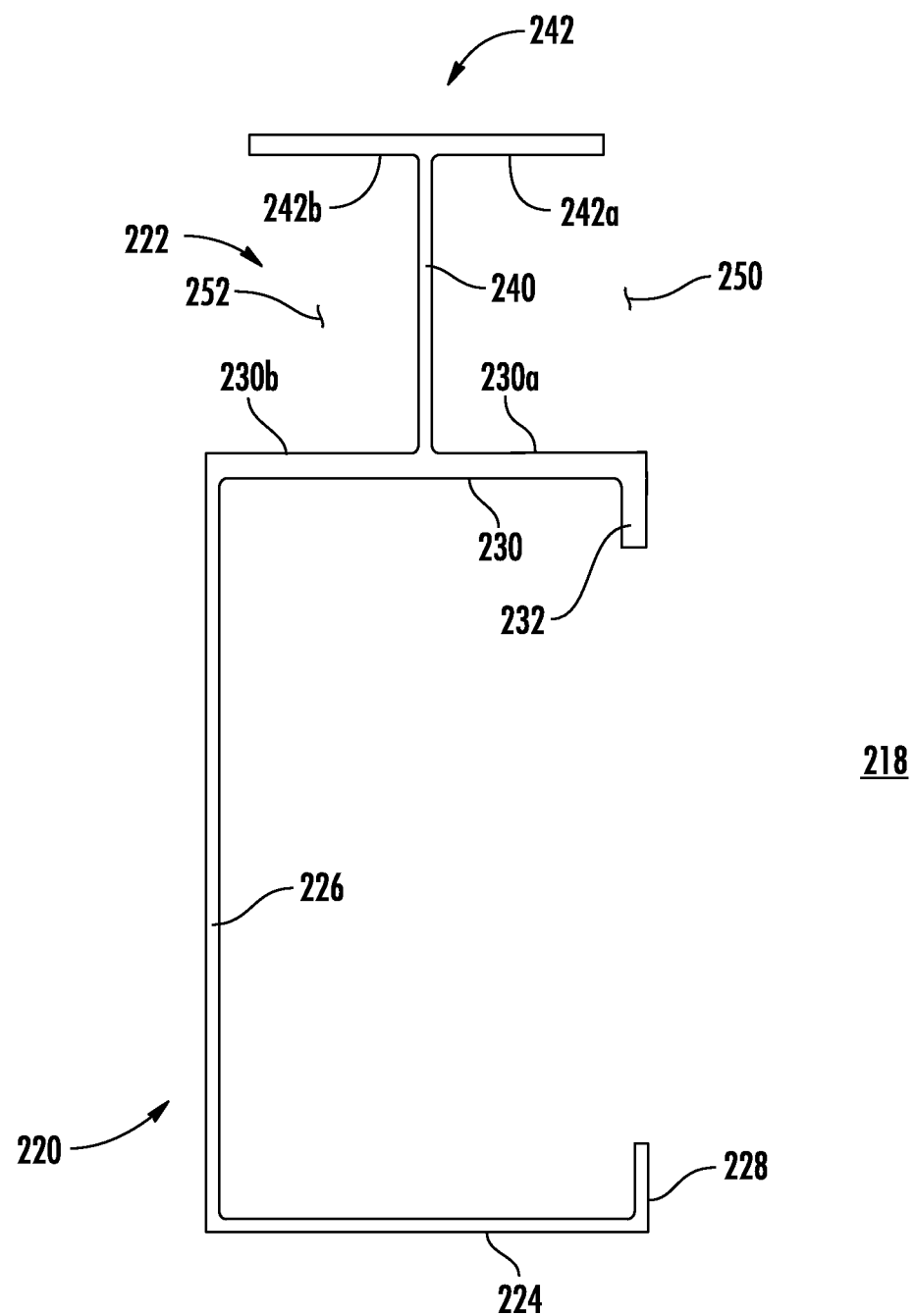
FIG. 4 is an end view of another embodiment of an improved purlin used in the structure of FIG. 1 in accordance with the present invention.

Turning now to FIG. 4, an end view is illustrated of another embodiment of an improved purlin 218 that can be used in the structure of FIG. 1 in accordance with the present invention. Purlin 218 basically includes a C-shaped channel structure, generally designated 220, with a T-shaped structure, generally designated 222, integrally attached to an upper surface thereof. It will be appreciated that purlin 218 incorporates a much sturdier structure without being unduly heavier or more difficult to manufacture.

C-shaped channel 220 includes a horizontal lower or mounting wall 224 with an upright wall 226 extending vertically upwardly from one edge. An upright vertical flange 228 is optionally formed at the outer edge of mounting wall 224 to add stiffness or additional lateral support to purlin 218. A second horizontal wall 230 extends from the upper edge of upright wall 226 in a parallel spaced apart overlying relationship to mounting wall 224. A downwardly directed vertical flange 232 is optionally formed at the outer edge of second horizontal wall 230 to add stiffness or additional lateral support to purlin 218. Integrally formed mounting wall 224, upright wall 226, second horizontal wall 230, and flanges 228 and 232 extend longitudinally the entire length of purlin 218 and cooperate to define C-shaped channel 220.

T-shaped structure 222 includes an upright wall 240 extending vertically upwardly from the upper surface of second horizontal wall 230 and longitudinally the entire length of purlin 218. Upright wall 240 is affixed to the upper surface of second horizontal wall 230 approximately midway between the edges so that second horizontal wall 230 is divided into approximately equal portions 230a (extending to the right) and 230b (extending to the left). A cross piece 242 is integrally formed in a horizontally extending orientation along the upper edge of upright wall 240. A portion of cross piece 242 extending to the right from upright wall 240 is designated 242a and a portion of cross piece 242 extending to the left from upright wall 240 is designated 242b.

Thus portion 230a of second horizontal wall 230 and portion 243a of cross piece 242 form a longitudinally extending, outwardly opening channel 250 and portion 230b of second horizontal wall 230 and portion 243b of cross piece 242 form a longitudinally extending channel 252 opening outwardly in an opposed direction to channel 250. It will be understood that channel 250, along with a facing channel in the next adjacent purlin form a complete track for receiving and holding opposed edges of a solar panel or flat roof section. Similarly, channel 252, along with a facing channel in the next adjacent purlin, form a complete track for receiving and holding opposed edges of an adjacent solar panel or flat roof section.

It should be noted that in this preferred embodiment C-shaped channel 220 and T-shaped structure 222 are formed as an integral unit with all components formed as a single integral structure. However, it will be understood that in some special applications portions of purlin 219 might be formed separately and attached by welding or the like. For example T-shaped structure 222 and C-shaped channel 220 might be formed separately and attached in the orientation illustrated by welding or the like. In the instance where purlin 218 is formed as a single integral unit for the entire length, at least one method of manufacture includes extruding in a well known operation.

Some measurements for purlin 218, manufactured in accordance with the present invention as illustrated in FIG. 4 include the following measurements. The total vertical height from the lower surface of mounting wall 224 to the upper surface of cross piece 242 is 6.0"; the horizontal width of mounting wall 224 and second horizontal wall 230 is 2.50"; the vertical height of flanges 228 and 232 is 0.50"; the vertical height from the upper surface of second horizontal wall 230 to the upper surface of cross piece 242 is 1.750"; and the total horizontal width of cross piece 242 is 2.0" with each portion 242a and 242b extending 1.0" from the center of upright wall 240. In this specific embodiment, flange 232 and second horizontal wall 230 are formed with a thickness of 0.120" and the remainder of C-shaped channel 220 is formed with a thickness of 0.060". Also, cross piece 242 is formed with a thickness of 0.120" and upright wall 240 may be formed with a thickness of 0.060". It will be understood that these measurements are simply included for example and any measurements may change for specific applications.

Figure 5:
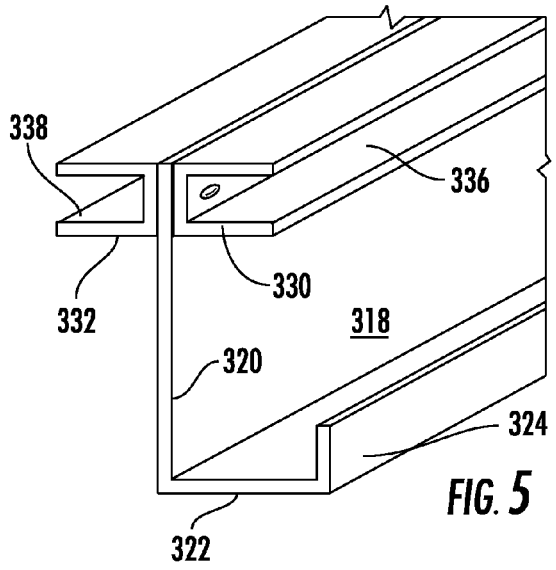
FIG. 5 is an end perspective view illustrating another purlin and one method of assembling the purlin, in accordance with the present invention.

Turning now to FIG. 5, an end perspective view is illustrated of another purlin, designated 318, which may be used in the structure illustrated in FIG. 1 instead of the purlin illustrated in FIG. 2. Purlin 318 includes a major side or upright wall 320 with a lower or mounting wall 322 extending horizontally at a right angle to upright wall 320. An upright flange 324 is optionally formed at the outer edge of mounting wall 322 to add stiffness or additional lateral support to purlin 318. Upright wall 320, mounting wall 322, and flange 324 extend longitudinally the entire length of purlin 318. The lower surface of mounting wall 322 is designed to be mounted to and supported on roof beams, such as cantilever beams 14 in FIG. 1. The attaching of purlins 318 to the roof beams is described in detail in one or both of the above cited copending patent applications and will not be elaborated upon further herein.

In this specific method and structure, upright wall 320, mounting wall 322, and flange 324 are provided as a unit or a stand-alone component of purlin 318. A first U-shaped channel member 330 and a second U-shaped channel member 332 are also provided as components of purlin 318. The components are then assembled into purlin 318 by abutting channel member 330 against upright wall 320 adjacent the right upper end so that it defines an outwardly opening channel 336 and abutting channel member 332 against upright wall 320 adjacent the left upper end so that it defines an outwardly opening channel 338. Upright wall 320, U-shaped channel member 330, and U-shaped channel member 332 are then fixedly attached together by some convenient means such as spot welding (preferably), riveting, etc.

In the preferred embodiment purlin 318 is manufactured from any convenient metal such as aluminum, sheet steel, etc. Generally, upright wall 320, U-shaped channel member 330, and U-shaped channel member 332 can be fabricated from convenient metal material, such as a relatively heavy gauge sheet metal (e.g. 14 gauge to 25 gauge) with the specific metal selected for any specific roof application. For example in roof applications requiring substantial support the sheet metal selected might be sheet steel while in applications requiring less support but where weight might be a consideration sheet aluminum might be used. Thus, spot welding can be used to conveniently and quickly assemble the three components into a complete purlin at the factory.

Figure 6:
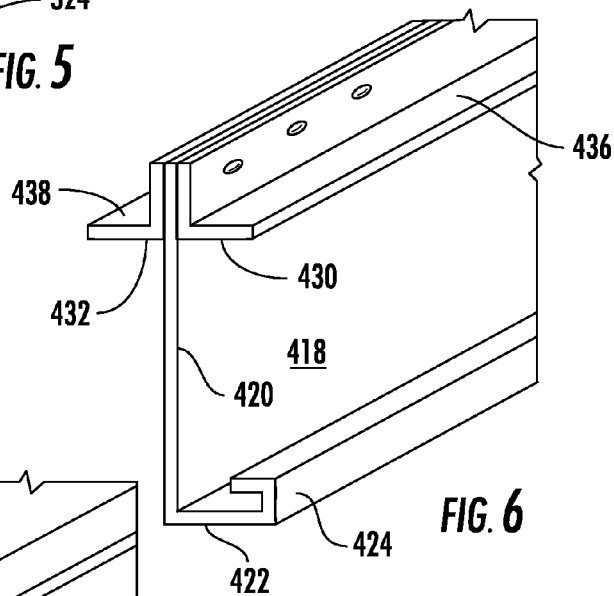
FIG. 6 is an end perspective view illustrating another purlin and one method of assembling the purlin, in accordance with the present invention.

Turning now to FIG. 6, an end perspective view is illustrated of another purlin, designated 418. Purlin 418 includes a major side or upright wall 420 with a lower or mounting wall 422 extending horizontally at a right angle to upright wall 420. An upright flange 424 is optionally formed at the outer edge of mounting wall 422 to add stiffness or additional lateral support to purlin 418. Upright wall 420, mounting wall 422, and flange 424 extend longitudinally the entire length of purlin 418. The lower surface of mounting wall 422 is designed to be mounted to and supported on roof beams, such as cantilever beams 14 in FIG. 1. The attaching of purlins 418 to the roof beams is described in detail in one or both of the above cited copending patent applications and will not be elaborated upon further herein.

In this specific method and structure, upright wall 420, mounting wall 422, and flange 424 are provided as a unit or a stand-alone component of purlin 418. A first L-shaped member 430 and a second L-shaped member 432 are also provided as components of purlin 418. The components are then assembled into purlin 418 by abutting L-shaped member 430 against upright wall 420 adjacent the right upper end so that it defines an outwardly extending shelf or arm 436 and abutting L-shaped member 432 against upright wall 420 adjacent the left upper end so that it defines an outwardly extending shelf or arm 438. For purposes of this disclosure, L-shaped members 430 and 432 will be deemed to define horizontally outwardly opening channels. For purposes of ease of understanding the pair of elongated L-shaped members 430 and 432 may be hereinafter referred to as "angle-irons" (although not necessarily formed of iron or steel) affixed to an upper end of the upright wall in an upright leg-to-upright leg orientation. Upright wall 420, L-shaped member 430, and L-shaped member 332 are then fixedly attached together by some convenient means such as spot welding (preferably), riveting, etc.

In the use of Purlin 418 of FIG. 6, the purlins are positioned and affixed on a roof as described above but rather than sliding roof sections 20 into channels (as described in conjunction with purlin 118), roof sections 20 are simply placed on the upper surfaces of each shelf or arm 436 and 438. Roof sections 20 can then be fixedly engaged to each shelf or arm 436 and 438 by inserting screws, bolts, etc. from the bottom.

Figure 7:
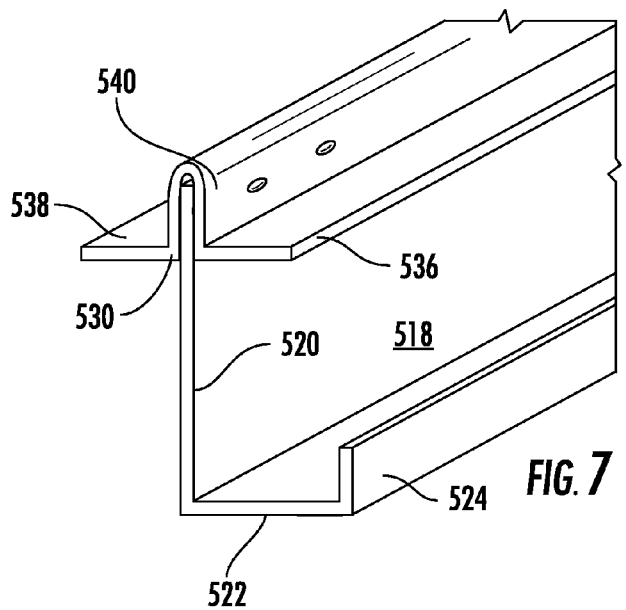
FIG. 7 is an end perspective view illustrating another purlin and one method of assembling the purlin, in accordance with the present invention.

Turning now to FIG. 7, an end perspective view is illustrated of another purlin, designated 518. Purlin 518 includes a major side or upright wall 520 with a lower or mounting wall 522 extending horizontally at a right angle to upright wall 520. An upright flange 524 is optionally formed at the outer edge of mounting wall 522 to add stiffness or additional lateral support to purlin 518. Upright wall 520, mounting wall 522, and flange 524 extend longitudinally the entire length of purlin 518. The lower surface of mounting wall 522 is designed to be mounted to and supported on roof beams, such as cantilever beams 14 in FIG. 1. The attaching of purlins 518 to the roof beams is described in detail in one or both of the above cited copending patent applications and will not be elaborated upon further herein.

In this specific method and structure, upright wall 520, mounting wall 522, and flange 524 are provided as a unit or a stand-alone component of purlin 518. A flat strip of sheet metal 530 is formed with a U-shaped, downwardly opening channel 540 in the mid portion thereof. Channel 540 extends longitudinally the length of strip 530 and is further formed with transversely outwardly extending arms 536 and 538. The components are assembled into purlin 518 by positioning the upper end of upright wall 520 in the downwardly opening channel 540 and fixing the components together by some convenient means, such as spot welding (preferably), riveting, etc. Outwardly extending arms 536 and 538 define outwardly extending horizontal shelves on opposite sides of upright wall 520 adjacent the upper end. For purposes of this discussion strip 530 and outwardly extending arms 536 and 538 will be deemed to define horizontally outwardly opening channels.

In the use of Purlin 518 of FIG. 7, the purlins are positioned and affixed on a roof as described above but rather than sliding roof sections 20 into channels (as described in conjunction with purlin 118), roof sections 20 are simply placed on the upper surfaces of each arm 536 and 538 on opposite sides of U-shaped, downwardly opening channel 540. Roof sections 20 can then be fixedly engaged to each arm 536 and 538 by inserting screws, bolts, etc. from the bottom.

Figure 8:
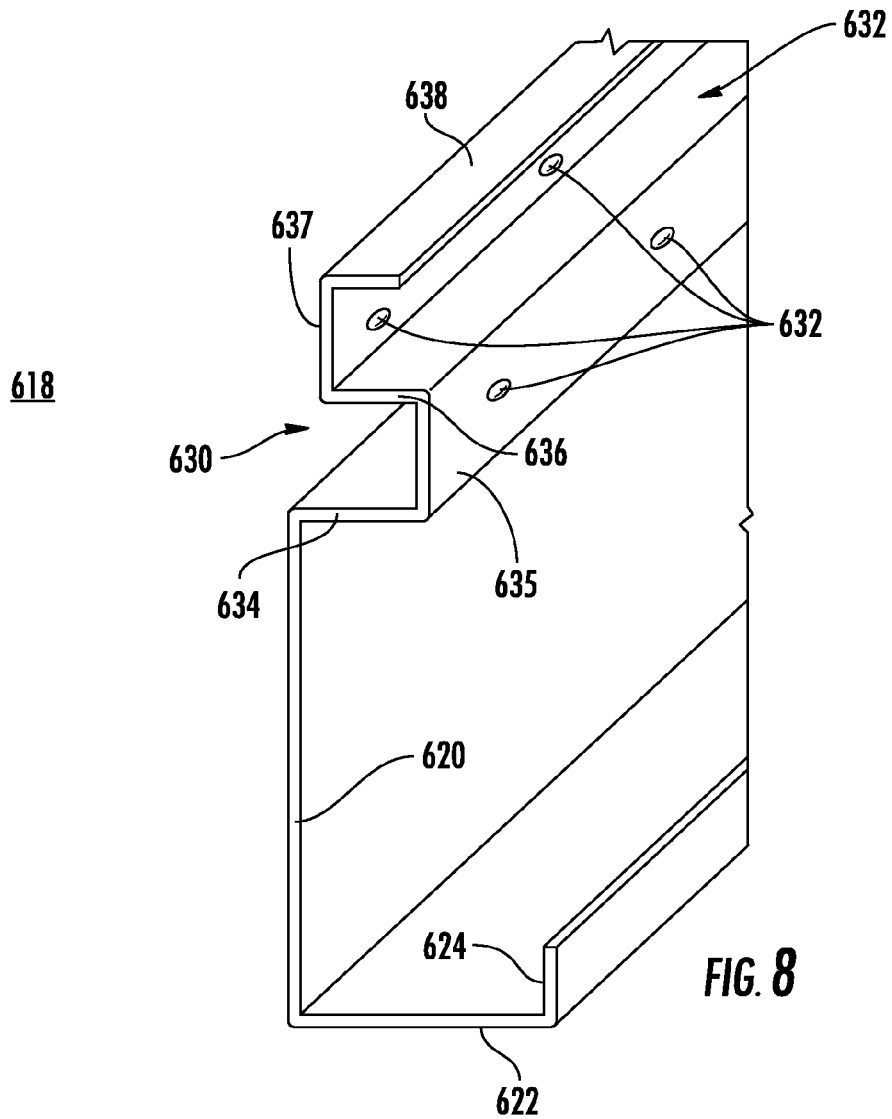
FIGS. 8 and 9 are an end perspective view and an end view, respectively, illustrating another purlin, in accordance with the present invention.
Figure 9:
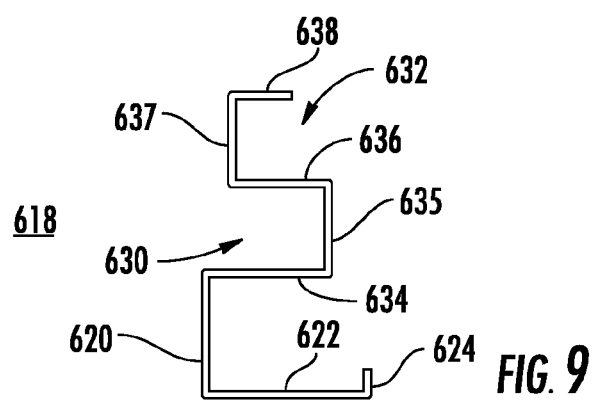

Turning now to FIGS. 8 and 9, another purlin, designated 618 is illustrated. Purlin 618 includes a major side or upright wall 620 with a lower or mounting wall 622 extending horizontally at a right angle to upright wall 620. An upright flange 624 is optionally formed at the outer edge of mounting wall 622 to add stiffness or additional lateral support to purlin 618. Upright wall 620, mounting wall 622, and flange 624 extend longitudinally the entire length of purlin 618. The lower surface of mounting wall 622 is designed to be mounted to and supported on roof beams, such as cantilever beams 14 in FIG. 1. The attaching of purlins 618 to the roof beams is described in detail in one or both of the above cited copending patent applications and will not be elaborated upon further herein.

In this specific method and structure, the material forming upright wall 620 continues and is bent into a first U-shaped channel member 630 and a second U-shaped channel member 632. U-shaped channel 630 is defined by a lower horizontal wall 634, extending at approximately a ninety degree angle to the upper end of upright wall 620, a vertical wall 635 extending upwardly from horizontal wall 634, and a horizontal wall 636 extending parallel to and spaced upwardly from horizontal wall 634. U-shaped channel member 632 is defined by horizontal wall 636, which forms a lower wall, a vertical wall 637 extending upwardly from horizontal wall 636, and a horizontal wall 638 extending parallel to and spaced upwardly from horizontal wall 636. Here it should be specifically noted that all of the walls and components of purlin 618 are most conveniently formed from a single piece of sheet metal and can be bent into the shape illustrated or extruded directly in a well known operation. Thus, the manufacture of purlin 618 is a simple one step operation. While the sheet metal can vary in thickness and type, in a preferred embodiment 14 gauge sheet steel is employed.

In the use of Purlin 618 of FIGS. 8 and 9, the purlins are positioned and affixed on a roof as described above and roof sections 20 are slide lengthwise into channels 630 and 632 (as described in conjunction with purlin 118). Holes 631 are illustrated in the vertical walls of channels 630 and 632 which may be used to secure roof panels 20 therein if desired. It will be noted that channels 630 and 632 open in opposite directions so that during assembly of a structure such as structure 10 of FIG. 1 it will be necessary to alternate purlins 618 so that channels 630 in adjacent purlins open toward each other and channels 632 in adjacent purlins open toward each other. It will also be noted that roof sections 20 in channels 632 are offset upwardly from roof sections 20 in channels 630. However, roof sections 20 in channels 632 overlap the edges of roof sections 20 in channels 630 so that there is no loss of integrity.

Thus, it will be understood that the new and improved purlins for use in roof structures easily position and mount solar panels or other flat roof sections with substantially reduced effort and error. The new and improved purlins for use in flat roof structures are manufactured from any convenient metal such as aluminum, sheet steel, etc. The new and improved purlins can be fabricated in a variety of different methods by providing various components that are easily and quickly assembled into finished purlins at the factory or by simply bending the sheet metal into the prescribed shape. Using the multiple component methods of fabrication, the purlins can be manufactured with substantially reduced machinery cost. Further, the new and improved purlins for use in flat roof structures can be easily bolted to roof beams at the site and do not require any on-site welding or any special tools.

Various changes and modifications to the embodiment herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. An elongated purlin in a roof structure comprising:
    said roof structure including a plurality of vertical columns with a plurality of horizontal, spaced apart roof beams attached thereto, each spaced apart roof beam having an upper surface;
    the elongated purlin including:
        an elongated mounting wall having a length and mounted to the upper surfaces of the plurality of roof beams and supported on the roof beams;
        an upright wall affixed to the mounting wall and having a length extending longitudinally the length of the mounting wall; and
        first and second horizontally outwardly opening channels affixed to the upright wall and extending longitudinally the length of the upright wall, the first and second channels opening outwardly in opposite directions and each of the first and second channels receiving an edge of a solar panel or roof section engaged therein.

2. An elongated purlin as claimed in claim 1 wherein the elongated mounting wall, the upright wall, and the first and second channels are formed of sheet metal with a gauge in a range of 14 to 25.

3. An elongated purlin as claimed in claim 1 wherein the elongated mounting wall, the upright wall, and the first and second channels are formed of sheet steel with a gauge in a range of 14 to 25.

4. An elongated purlin as claimed in claim 1 wherein the first and second channels are defined by a first cross piece attached to the upright wall so as to extend substantially orthogonally to a plane containing the upright wall and a second cross piece attached to the upright wall so as to extend substantially orthogonally to the plane, the second cross piece being spaced from the first cross piece along the plane.

5. An elongated purlin as claimed in claim 1 wherein the mounting wall and the upright wall are defined by a C-shaped channel structure, the first and second channels are defined by an upper surface of the C-shaped channel structure and a T-shaped structure affixed to the upper surface.

6. An elongated purlin as claimed in claim 5 wherein the C-shaped channel structure and the T-shaped structure are formed as an integral unit.

7. An elongated purlin as claimed in claim 1 wherein the mounting wall and the upright wall are formed as an integral unit.

8. An elongated purlin for use in a roof structure said elongated purlin comprising:
    an elongated mounting wall having a length and designed to be mounted to and supported on roof beams;
    an upright wall formed integrally with the mounting wall and having a length extending longitudinally the length of the mounting wall;
    first and second horizontally outwardly opening channels affixed to the upright wall and extending the length of the upright wall, the first and second channels opening outwardly in opposite directions and each of the first and second channels being designed to receive an edge of a solar panel or roof section engaged therein;
    the elongated mounting wall, the upright wall, and the first and second horizontally outwardly opening channels being formed of sheet metal and the first and second channels being one of integrally formed with the upright wall or spot welded to the upright wall; and
    wherein said elongated purlin is mounted to said roof structure.

9. A method of fabricating an elongated purlin for use in a roof structure comprising:
    forming an elongated mounting wall with a length and designed to be mounted to and supported on roof beams;
    forming an upright wall integrally with the mounting wall and with a length extending longitudinally the length of the mounting wall;
    forming first and second horizontally outwardly opening channels designed to receive an edge of a solar panel or roof section engaged therein, and affixing the first and second channels to the upright wall in an outwardly opening orientation, the first and second horizontally outwardly opening channels being directed in opposite directions; and
    mounting said elongated purlin to said roof structure.

10. A method as claimed in claim 9 wherein the steps of forming the elongated mounting wall, the upright wall, and the first and second horizontally outwardly opening channels includes forming of sheet metal.

11. A method as claimed in claim 9 wherein the step of affixing the first and second channels to the upright wall includes one of integrally forming the first and second channels with the upright wall or spot welding the first and second channels to the upright wall.

* * * * *